(12) United States Patent
Koerber et al.

(10) Patent No.: US 10,616,564 B2
(45) Date of Patent: Apr. 7, 2020

(54) DISPLAY DEVICE AND DISPLAY CONTROL METHOD

(71) Applicant: KONINKLIJKE PHILIPS N.V., Eindhoven (NL)

(72) Inventors: Achim Gerhard Rolf Koerber, Eindhoven (NL); Bart Kroon, Eindhoven (NL); Mark Thomas Johnson, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 15/769,117

(22) PCT Filed: Oct. 24, 2016

(86) PCT No.: PCT/EP2016/075481
§ 371 (c)(1),
(2) Date: Apr. 18, 2018

(87) PCT Pub. No.: WO2017/080799
PCT Pub. Date: May 18, 2017

(65) Prior Publication Data
US 2018/0359461 A1 Dec. 13, 2018

(30) Foreign Application Priority Data
Nov. 10, 2015 (EP) ..................................... 15193777

(51) Int. Cl.
*H04N 13/324* (2018.01)
*H04N 13/305* (2018.01)
(Continued)

(52) U.S. Cl.
CPC ........... *H04N 13/324* (2018.05); *G02B 27/00* (2013.01); *G02B 30/27* (2020.01);
(Continued)

(58) Field of Classification Search
CPC ..... H04N 13/305; H04N 13/324; G02B 27/00
See application file for complete search history.

(56) References Cited

U.S. PATENT DOCUMENTS

| 6,055,013 A | 4/2000 | Woodgate et al. |
| 9,257,070 B2 | 2/2016 | Ko |

(Continued)

FOREIGN PATENT DOCUMENTS

| WO | 2004016460 A1 | 2/2004 |
| WO | 2005029873 A1 | 3/2005 |

(Continued)

OTHER PUBLICATIONS

Kim et al "Enabling Concurrent Dual views on common LCD screens" CHI'12, May 5-10, 2012, Austin, Texas, USA. Copyright 2012, p. 2175-2184.

*Primary Examiner* — Girumsew Wendmagegn

(57) ABSTRACT

A display device has a display panel (70) and a color filter layer (72) spaced from the display panel, comprising an array of color filter portions. In a privacy mode (narrow viewing angle mode), the display panel produces output regions of different light output color, which regions are aligned with corresponding color portions of the color filter layer. In a public mode (wide viewing angle mode) the display panel produces light containing all of the output colors to all of the output regions. By providing a color filter layer spaced from the display panel, color filtering is used to control the range of angles over which an image is output. The color filter layer is in essence moved away from the display panel. The spacing between the two and the width of the color filter portions determines the extent by which the light output is angularly limited.

18 Claims, 7 Drawing Sheets

(51) Int. Cl.
- *H04N 13/359* (2018.01)
- *G09G 3/34* (2006.01)
- *G02B 27/00* (2006.01)
- *G09G 3/00* (2006.01)
- *H04N 13/351* (2018.01)
- *H04N 13/354* (2018.01)
- *G02B 30/27* (2020.01)
- *H04N 13/349* (2018.01)
- *H04N 13/398* (2018.01)
- *G02F 1/1335* (2006.01)
- *G09G 3/36* (2006.01)
- *H04N 13/30* (2018.01)
- *F21V 8/00* (2006.01)

(52) U.S. Cl.
CPC .. *G02F 1/133514* (2013.01); *G02F 1/133526* (2013.01); *G02F 1/133621* (2013.01); *G09G 3/003* (2013.01); *G09G 3/3413* (2013.01); *H04N 13/305* (2018.05); *H04N 13/349* (2018.05); *H04N 13/351* (2018.05); *H04N 13/354* (2018.05); *H04N 13/359* (2018.05); *H04N 13/398* (2018.05); *G02B 6/003* (2013.01); *G02F 2001/133622* (2013.01); *G09G 3/3611* (2013.01); *G09G 2358/00* (2013.01); *H04N 2013/40* (2018.05); *H04N 2013/403* (2018.05); *H04N 2213/001* (2013.01)

(56) References Cited

U.S. PATENT DOCUMENTS

| | | |
|---|---|---|
| 2009/0067156 A1 | 3/2009 | Bonnett et al. |
| 2009/0310064 A1 | 12/2009 | Choe et al. |
| 2010/0295755 A1 | 11/2010 | Broughton et al. |
| 2011/0122329 A1* | 5/2011 | Broughton ......... G02B 27/2214 349/15 |
| 2012/0200802 A1 | 8/2012 | Large |
| 2013/0114019 A1 | 5/2013 | Ijerman et al. |
| 2013/0265528 A1 | 10/2013 | Robinson et al. |

FOREIGN PATENT DOCUMENTS

| | | |
|---|---|---|
| WO | 2005031444 A2 | 4/2005 |
| WO | 2006046174 A2 | 5/2006 |
| WO | 2007054851 A1 | 5/2007 |
| WO | 2007072289 A2 | 6/2007 |
| WO | 2007072330 A1 | 6/2007 |
| WO | 2008020399 A1 | 2/2008 |
| WO | 2008032248 A1 | 3/2008 |
| WO | 2013048847 A2 | 4/2013 |
| WO | 2013179190 A1 | 12/2013 |

\* cited by examiner

DISPLAY DEVICE AND DISPLAY CONTROL METHOD

CROSS-REFERENCE TO PRIOR APPLICATIONS

This application is the U.S. National Phase application under 35 U.S.C. § 371 of International Application No. PCT/EP2016/075481, filed on Oct. 24, 2016, which claims the benefit of EP Patent Application No. EP 15193777.8, filed on Nov. 10, 2015. These applications are hereby incorporated by reference herein.

FIELD OF THE INVENTION

This invention relates to a display device which is able to provide a privacy mode and a public mode. It relates particularly but not exclusively to an autostereoscopic display device with a display panel having an array of display pixels for producing a display and an imaging arrangement for directing different views to different spatial positions.

BACKGROUND OF THE INVENTION

A first example of an imaging arrangement for use in an autostereoscopic display device of this type of display is a barrier, for example with slits that are sized and positioned in relation to the underlying pixels of the display. In a two-view design, the viewer is able to perceive a 3D image if his/her head is at a fixed position. The barrier is positioned in front of the display panel and is designed so that light from the odd and even pixel columns is directed towards the left and right eye of the viewer, respectively.

A drawback of this type of two-view display design is that the viewer has to be at a fixed position, and can only move approximately 3 cm to the left or right. In a more preferred embodiment there are not two sub-pixel columns beneath each slit, but several. In this way, the viewer is allowed to move to the left and right and perceives a stereo image in his/her eyes all the time.

The barrier arrangement is simple to produce but is not light efficient. A preferred alternative is therefore to use a lens arrangement as the imaging arrangement. An array of elongated lenses extending parallel to one another overlies the display pixel array and acts as a view forming means. These are known as "lenticular lenses". Outputs from the display pixels are projected through these lenticular lenses, which function to modify the directions of the outputs.

The lenticular elements are provided as a sheet of elements, each of which comprises an elongate partial-cylindrical (e.g. semi-cylindrical) lens element. The lenticular elements extend generally in the column direction of the display panel, with each lenticular element overlying a respective group of two or more adjacent columns of display sub-pixels.

The display panel for example comprises a two-dimensional liquid crystal display panel having a row and column array of display pixels (wherein a "pixel" typically comprises a set of "sub-pixels", and a "sub-pixel" is the smallest individually addressable, single-color, picture element). The sub-pixels together act as an image forming means to produce a display.

In an arrangement in which, for example, each lenticule is associated with two columns of display sub-pixels, the display sub-pixels in each column provide a vertical slice of a respective two dimensional sub-image. The lenticular sheet directs these two slices, and corresponding slices from the display pixel columns associated with the other lenticules, to the left and right eyes of a user positioned in front of the sheet, so that the user observes a single stereoscopic image. The sheet of lenticular elements thus provides a light output directing function.

In other arrangements, each lenticule is associated with a group of four or more adjacent display sub-pixels in the row direction. Corresponding columns of display sub-pixels in each group are arranged appropriately to provide a vertical slice from a respective two dimensional sub-image. As a user's head is moved from left to right, a series of successive, different, stereoscopic views are perceived creating, for example, a look-around impression.

Increasing the number of views improves the 3D impression but reduces the image resolution as perceived by the viewer, since all views are displayed at the same time by the native display. A compromise is typically found whereby a number of views (such as 9 or 15) are displayed in so-called viewing cones, and these viewing cones repeat across the field of view. The end result is a display with a large viewing angle, although viewers are not entirely free in choosing their location from which to view the 3D monitor or television: at the boundaries between viewing cones the 3D effect is absent and ghost images appear. This wide viewing angle is a problem in situations where the user of the display would prefer no eavesdropping on all or certain parts of the display content. One typical example is reading of mail and documents during commutes.

It has been proposed to provide a display with private and public viewing modes. This has also been proposed for 3D autostereoscopic displays, for example in WO 2013/179190.

This document discloses a lens-based autostereoscopic display device, in which a light blocking arrangement is provided between adjacent lens locations and the display is configurable in at least two different modes: a privacy mode in which the light blocking arrangement blocks light which is directed between the lenses; and a public mode in which the light blocking arrangement does not block the light which is directed between the lenses.

The switchable privacy mode is able to turn on and off cone repetition. With cone repetition, the display functions exactly like a regular lens-based autostereoscopic display, with a wide viewing angle similar to a regular 3D lenticular display. Without cone repetition (because of the blocking function between lenses), only the primary cone is visible and all other cones appear black. In the privacy mode, the output brightness to the desired viewing cone is not reduced, and the full display resolution is used.

The 3D lenticular display may also be switchable between a 2D and 3D mode, either because the lens is electro-optically switchable or because the lens is birefringent and the polarization of the display panel can be controlled. Especially when the light modulation by the light blocking arrangement is not based on polarization, the two functions can be independent and there can be four combined modes (2D private, 2D public, 3D private and 3D public).

The light blocking structures are however potentially difficult to manufacture, as they are vertical structures.

US 2009/0067156 discloses a display system with a variable angular illumination range. A narrow emitting backlight is used for a narrow private mode and a wide emitting backlight is used for a wide public mode.

There is therefore a need for a light blocking arrangement for implementing public and private modes which can be implemented with low cost and low complexity.

SUMMARY OF THE INVENTION

According to the invention, there is provided a display and method as defined in the independent claims.

In one aspect, the invention provides a display device comprising:
- a display panel; and
- a first color filter layer spaced from the display panel and adapted to receive light from the display panel, comprising an array of first color filter portions of at least three colors;
- wherein the display panel is configurable in:
  - a privacy mode for providing only a central viewing zone in which the display panel produces output regions of different light output color, which output regions are aligned with corresponding first color portions of the first color filter layer; and
    - a public mode for providing a central and lateral viewing zones in which the display panel produces light containing all of the output colors in each of the output regions.

By providing a color filter layer spaced from the display panel, color filtering is used to control the range of angles over which an image is output. If the display panel provides a single color image portion beneath the color filter layer, then the light of that color can only escape in a normal direction, because the other color filter portions to the sides block out the light. If the display panel provides light of all colors, some light can escape through all of the color filter portions allowing a wide viewing angle. The color filter layer is in essence moved from away the display panel. The spacing between the two and the width of the color filter portions determines the extent by which the light output is angularly limited.

The use of a color filter to implement the privacy function simplifies the design and manufacture in that the design become based on a simple layer stack.

The privacy mode is one in which an image is only visible from in front of the display. For example, the display has viewing zones arranged laterally across the field of view. A central viewing zone is directed forwardly, and there are lateral viewing zones to each side. By preventing light reaching the immediately lateral viewing zones (by filtering twice), only a forward display is provided. By allowing a display to the lateral viewing zones (because all output colors are provided), a wider angle display is created.

Each portion of the color filter layer is for example for passing a specific color. For example a red color filter portion allows red light to pass.

The at least three colors for example comprise red, green and blue.

The color portions of the color filter layer may be stripes. Stripes in the vertical direction (or indeed slightly offset from the vertical direction) provide control of the extent to which images are visible from the sides, which is of most interest for privacy displays.

In a first set of examples, the display panel is controllable in the privacy mode to provide the output regions of different light output color as stripes of different color at the same time, and in the public mode to provide a white output.

This version provides the display output as either a set of stripes at the same time (e.g. a red, green and blue striped image) or else a white output. When a white output is provided, the color filter layer functions as the display panel filter, and defines the different color sub-pixels. When the striped color output is provided, there are two color filtering operations. This enables laterally directed light to be blocked, in that a light output is only allowed where the output color from the display panel matches the color filter portion in the color filter layer.

For this version, the display panel may be a light emissive display panel or it may be a backlight and an array of light modulating sub-pixels. The backlight may then be capable of generating a multiple color output at different locations at the same time.

When a backlight and an array of controllable light modulating sub-pixels are combined, they enable control of the output colors from different regions of the display panel.

In a second set of examples, the backlight is controllable to provide different color outputs in sequence, wherein in the privacy mode the array of sub-pixels is adapted to provide stripes of output sub-pixels in synchronism with the backlight sequence, with the other sub-pixels set to a non-output state, thereby providing the output regions of different light output color in sequence.

This version provides a time sequential operation. For each backlight color, only a sub-set of sub-pixels are used, and the others are switched to black. This means a striped display panel output is provided in a sequence of different colors. This approach does not need a segmented backlight, in that the full backlight output is always the same color.

The display panel may have an angularly limited light output (for example by making a backlight output limited in its range of emission angles) such that the light from the light output regions of the display panel do not reach the next laterally offset corresponding color portions of the color filter array. The color filtering is used to block light immediately laterally to the sides of the normal direction (which is the direction in which the color filters align) and the backlight design is used to prevent light reaching further laterally offset viewing angles.

Instead (or as well), the display device may comprise a second color filter layer between the display panel and the lens array. This again may be used to block light at larger lateral viewing angles. For example, the second color filter layer may comprise a color subtractive filter layer arranged such that the light output from the light output regions of the display panel are filtered out before reaching the next laterally offset corresponding color portions of the color filter layer.

The second color filter layer is preferably offset from the first color filter layer by half the pitch of the portions of the color filter layer.

The device may comprise a lens array spaced from the display panel, wherein each lens of the lens array has one portion of the color filter layer.

The lens array may be used to implement a lens-based autostereoscopic display device. The switchable privacy mode is able to turn on and off cone repetition. With cone repetition, the display functions exactly like a regular lens-based autostereoscopic display. Without cone repetition (because of the color filter blocking function), the viewing angle is limited to one cone. The opening angle of the single viewing cone is a lens design choice based on the relation between the lens pitch and sheet thickness.

Examples in accordance with another aspect of the invention provide a method of controlling a display device to provide a privacy mode and a public mode, wherein the display device comprises a display panel and a first color filter layer spaced from the display panel and adapted to receive light from the display panel comprising an array of first color filter portions of at least three colors;
  wherein the method comprises:
  in a privacy mode for providing only a central viewing zone, controlling the display panel to produce output regions of different light output color, which output regions are aligned with corresponding first color portions of the first color filter layer; and in a public mode for providing a central and lateral viewing zones, controlling the display panel to produce light containing all of the output colors to all of the output regions.

This method uses color filtering to provide the attenuation of lateral views when in a privacy mode. The method may comprise controlling a backlight in the privacy mode to provide the output regions of different light output color as stripes of different color at the same time, and controlling the backlight in the public mode to provide a white output.

Alternatively, the method may comprise controlling a backlight to provide different color outputs in sequence, and in the privacy mode controlling the array of sub-pixels to provide stripes of output sub-pixels in synchronism with the backlight sequence, with the other sub-pixels set to a non-output state, thereby providing the output regions of different light output color in sequence.

BRIEF DESCRIPTION OF THE DRAWINGS

An embodiment of the invention will now be described, purely by way of example, with reference to the accompanying drawings, in which.

DETAILED DESCRIPTION OF THE EMBODIMENTS

The invention provides a display device having a display panel and a color filter layer spaced from the display panel, comprising an array of color filter portions. In a privacy mode, the display panel produces output regions of different light output color, which regions are aligned with corresponding color portions of the color filter layer. In a public mode the display panel produces light containing all of the output colors to all of the output regions.

By providing a color filter layer spaced from the display panel, color filtering is used to control the range of angles over which an image is output. The color filter layer is in essence moved from away the display panel. The spacing between the two and the width of the color filter portions determines the extent by which the light output is angularly limited. The use of color filter to implement the privacy function simplifies the design and manufacture in that the design becomes based on a simple layer stack.

The invention will be described with reference to an autostereoscopic display device, but it can be used generally to provide a private and a public viewing mode.

Figure 1:
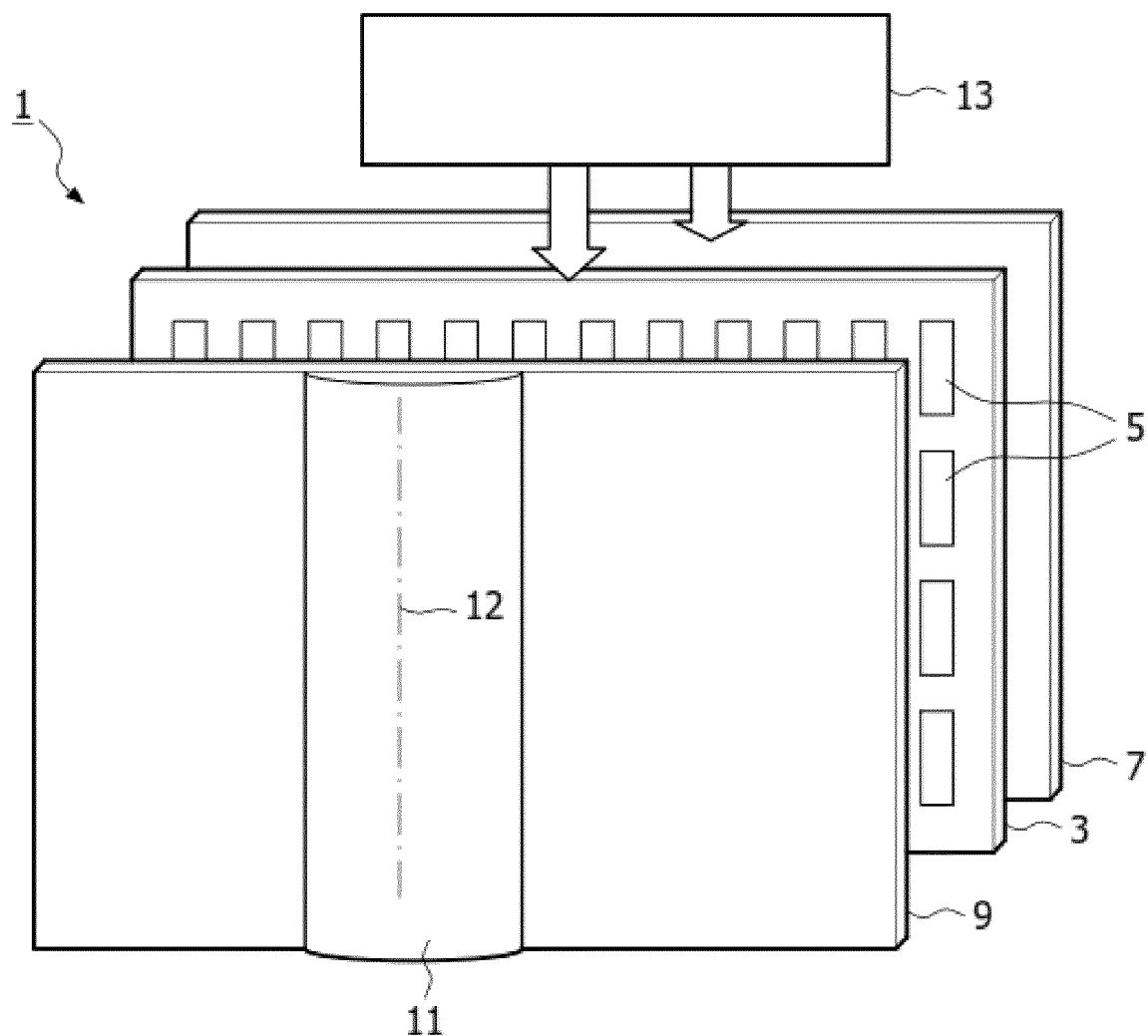
FIG. 1 is a schematic perspective view of a known autostereoscopic display device.

FIG. 1 is a schematic perspective view of a known direct view autostereoscopic display device 1. The known device 1 comprises a liquid crystal display panel 3 of the active matrix type that acts as a spatial light modulator to produce the display.

The display panel 3 has an orthogonal array of display sub-pixels 5 arranged in rows and columns. For the sake of clarity, only a small number of display sub-pixels 5 are shown in the Figure. In practice, the display panel 3 might comprise about one thousand rows and several thousand columns of display sub-pixels 5. In a black and white display panel a sub-pixel in fact constitutes a full pixel. In a color display a sub-pixel is one color component of a full color pixel. The full color pixel, according to general terminology comprises all sub-pixels necessary for creating all colors of a smallest image part displayed.

A full color pixel may have red (R) green (G) and blue (B) sub-pixels possibly augmented with a white sub-pixel or with one or more other elementary colored sub-pixels. For example, an RGB (red, green, blue) sub-pixel array is well known, although other sub-pixel configurations are known such as RGBW (red, green, blue, white) or RGBY (red, green, blue, yellow).

The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarizing layers are also provided on the outer surfaces of the substrates.

Each display sub-pixel 5 comprises opposing electrodes on the substrates, with the intervening liquid crystal material therebetween. The shape and layout of the display sub-pixels 5 are determined by the shape and layout of the electrodes. The display sub-pixels 5 are regularly spaced from one another by gaps.

Each display sub-pixel 5 is associated with a switching element, such as a thin film transistor (TFT) or thin film diode (TFD). The display sub-pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display sub-pixel array. Light from the light source 7 is directed through the display panel 3, with the individual display sub-pixels 5 being driven to modulate the light and produce the display.

The display device 1 also comprises a lenticular sheet 9, arranged over the display side of the display panel 3, which performs a view forming function. The lenticular sheet 9 comprises a row of lenticular elements 11 extending parallel to one another, of which only one is shown with exaggerated dimensions for the sake of clarity.

The lenticular elements 11 are in the form of convex cylindrical lenses, and they act as a light output directing means to provide different images, or views, from the display panel 3 to the eyes of a user positioned in front of the display device 1.

The device has a controller 13 which controls the backlight and the display panel.

The autostereoscopic display device 1 shown in FIG. 1 is capable of providing several different perspective views in different directions. In particular, each lenticular element 11 overlies a small group of display sub-pixels 5 in each row. The lenticular element 11 projects each display sub-pixel 5 of a group in a different direction, so as to form the several different views. As the user's head moves from left to right, his/her eyes will receive different ones of the several views, in turn.

The skilled person will appreciate that a light polarizing means must be used in conjunction with the above described array, since the liquid crystal material is birefringent, with the refractive index switching only applying to light of a particular polarization. The light polarizing means may be provided as part of the display panel or the imaging arrangement of the device.

Figure 2:
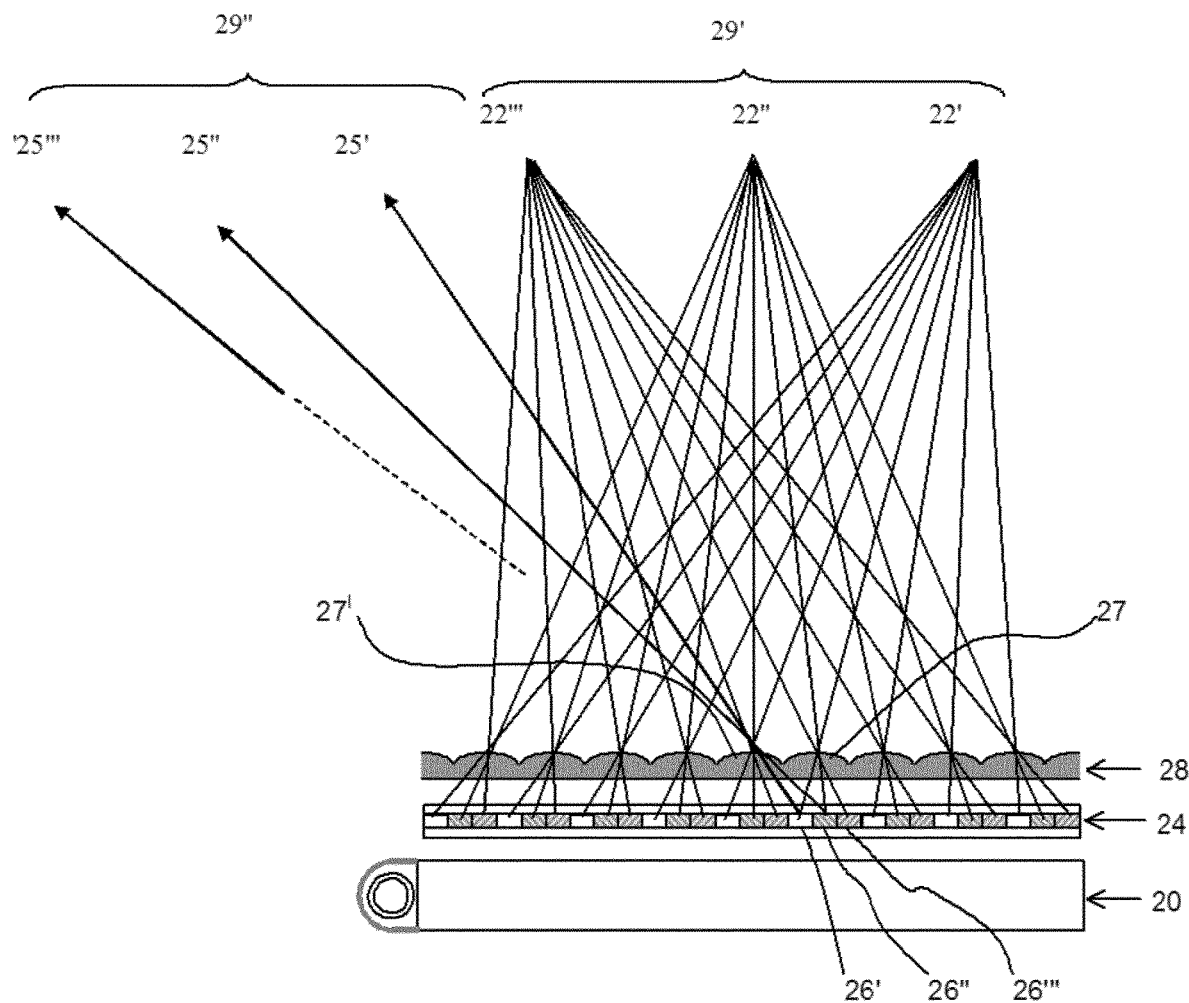
FIG. 2 shows how a lenticular array provides different views to different spatial locations.

FIG. 2 shows the principle of operation of a lenticular type imaging arrangement as described above and shows the backlight 20, display device 24 such as an LCD and the lenticular array 28 of lenses 27. FIG. 2 shows how the lenticular arrangement 28 directs different pixel outputs to three different spatial locations.

When applied to an autostereoscopic display, the invention relates to view repetition in such displays, which is explained below.

Figure 3:
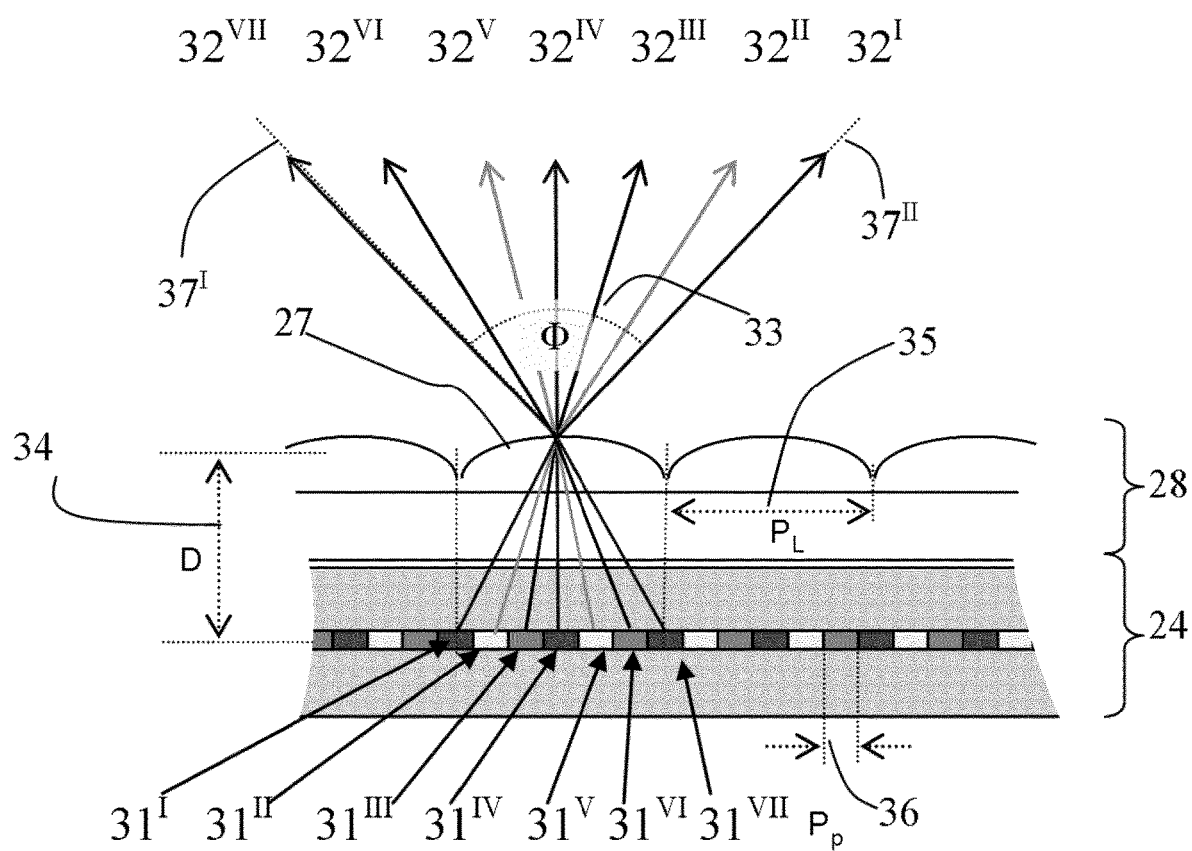
FIG. 3 shows a cross-section of the layout of a multi-view auto-stereoscopic display.

FIG. 3 shows a cross-section of the layout of a multi-view auto-stereoscopic display. Each sub-pixel $31^I$ to $31^{VII}$ underneath a certain lenticular lens 27 will contribute to a specific view $32^I$ to $32^{VII}$. All sub-pixels underneath this lens will together contribute to a cone of views. The width of this cone (between lines 37' and 37") is determined by the combination of several parameters: it depends on the distance 34 (D) from the pixel plane to the plane of the lenticular lenses. It also depends on the lens pitch 35 ($P_L$).

Figure 4:
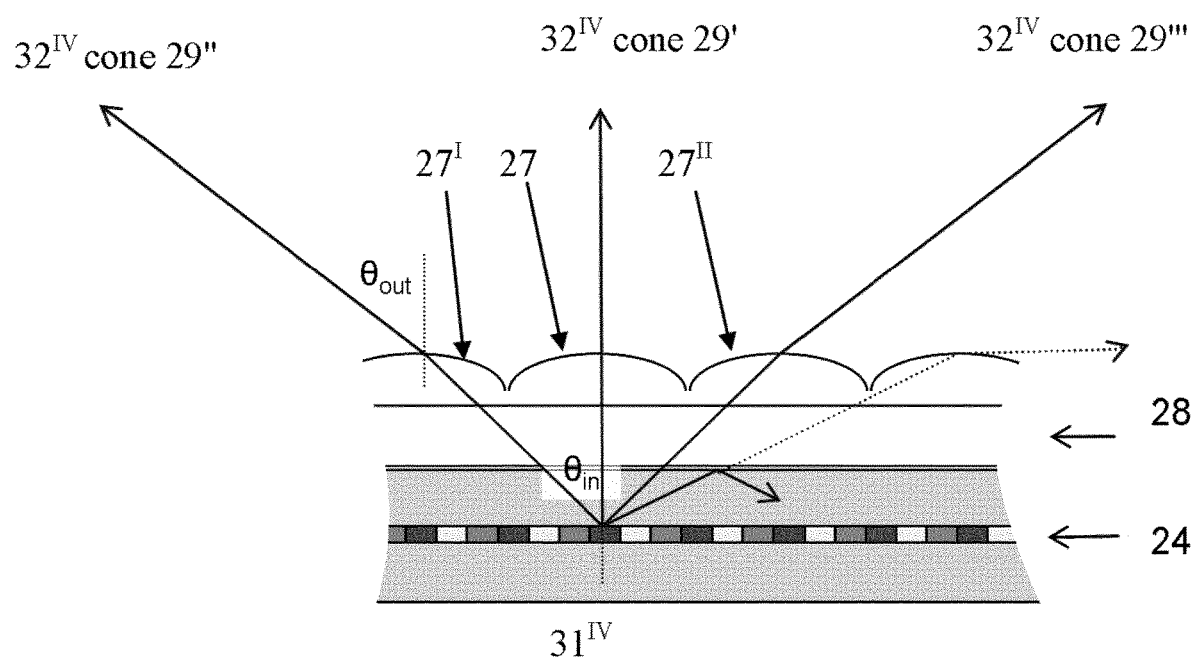
FIG. 4 is a close-up of FIG. 3.

FIG. 4 is a close-up of FIG. 3, and shows that the light emitted (or modulated) by a pixel of the display 24 is collected by the lenticular lens 27 closest to the pixel but also by neighboring lenses 27' and 27" of the lenticular arrangement 28. This is the origin of the occurrence of repeated cones of views. Pixel $31^{IV}$ for example contributes to viewing cones 29', 29" and 29''' as shown.

Figure 5:
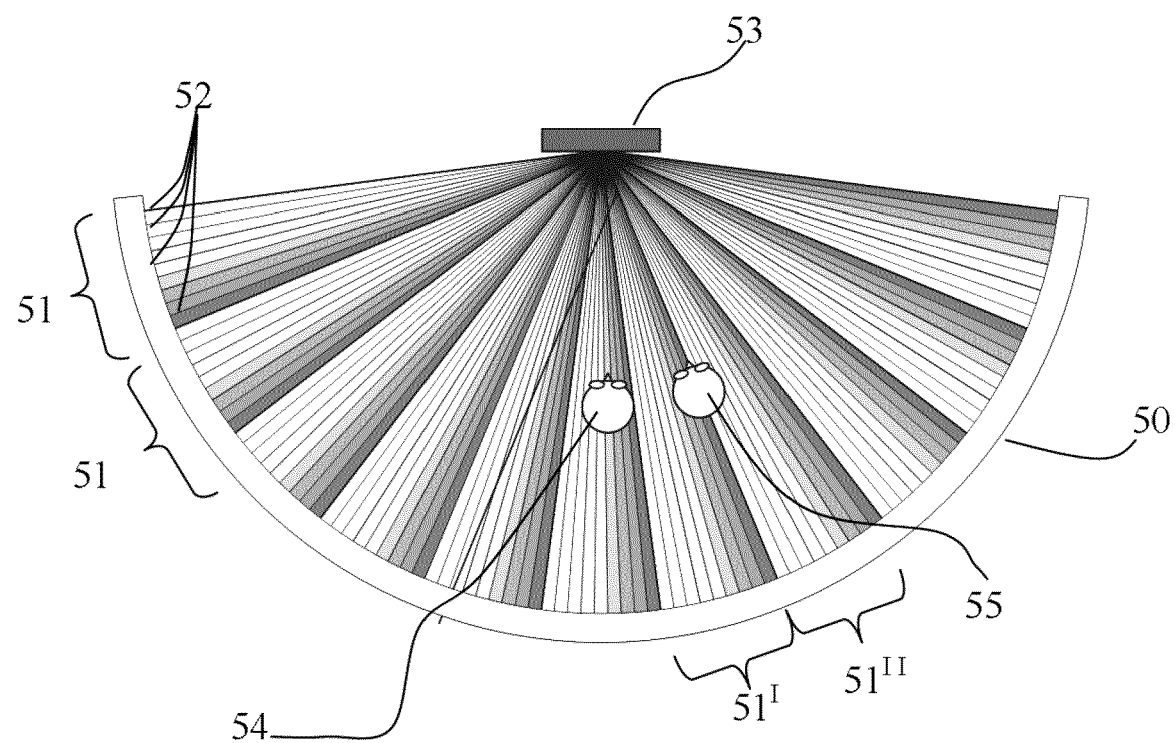
FIG. 5 shows a 9-view system in which the views produced in each of the sets of cones are equal.

The corresponding views produced in each of the cones are equal. This effect is schematically shown in FIG. 5 for a 9-view system (i.e. 9 views in each cone).

For an acceptable compromise between 3D effect and resolution penalty, the total number of views is limited to typically 9 or 15. These views have an angular width of typically 1 to 2 degrees. The views and the cones have the property that they are periodic.

Figure 6:
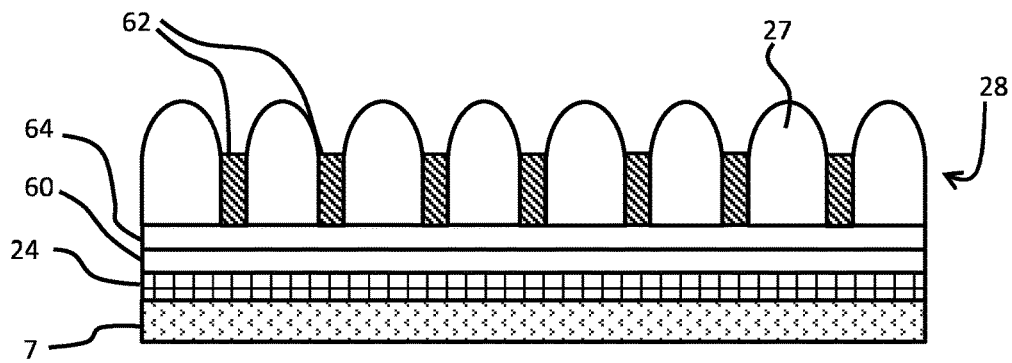
FIG. 6 shows an example of display device as disclosed in WO2013/179190.

FIG. 6 shows one example arrangement of WO 2013/179190 in which light blocking elements 62 are provided between the lenses. The arrangement as a whole (not necessarily the parts between the lenses) can be switched to a light transmitting or blocking mode. In this way, light from a pixel that would leave the display from a neighboring lens can be blocked while the primary viewing cone is unaltered. The system can be implemented as optical elements between the lenticules and additional layers which provide the control of the light entering/leaving the lenticular lenses so that the light blocking function is enabled or disabled.

Examples of possible light blocking arrangement disclosed in WO2013/179191 are:

(i) The light blocking structure is a polarizer, and the optical path includes at least one retarder.

(ii) The light blocking structure is a retarder and the optical path includes a polarizer.

(iii) The light blocking structure is an electrophoretic cell.

FIG. 6 is based on the use of a polarizer as the light blocking element. A first polarizer 60 is provided between the display panel 24 and the lenticular array 28. An arrangement of second polarizers 62 is provided between the lens elements. An optical retarder 64 is provided between the polarizers 60, 62.

The lenticular sheet can be manufactured by embossing the lenticular sheet and filling it with material that, when dry, has a polarizing function. An alternative is to produce lenticular and polarizing strips separately and then glue them together to form a lenticular sheet. That sheet can then be placed on top of the other display layers.

The retarder 64 can for example be a single liquid crystal cell covered on both sides with a single transparent (for example ITO) electrode, such that the retarder as a whole can be switched between polarity states. Alternatively the retarder 64 can be patterned such that an LC cell covers a single sub-pixel, pixel or set of pixels. In that case cells can be switched independently. This allows for content, task or application privacy modes such that sensitive information on the display (for example mail) is only visible in a small viewing cone, while insensitive information is not.

The structures disclosed require electrically controlled layers or stripes with their associated electrode arrangements, and this increases the complexity of the design of the lenticular structure.

This invention makes use of a color filter arrangement to provide the privacy and public modes.

Figure 7:
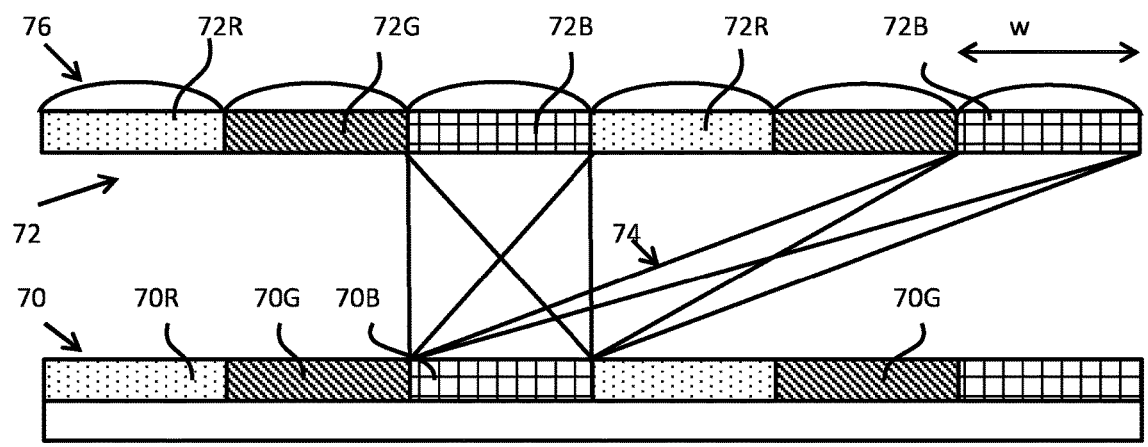
FIG. 7 shows a first example of display device of the invention.

FIG. 7 shows an example.

The display device comprises a display panel which is generally designated as 70. The display panel is able to generate image portions of different color. FIG. 7 shows portions of the surface of the display panel with different colors, such as red 70R, green 70G and blue 70B. Different ways to generate the different color image portions will be discussed below.

A color filter layer 72 is spaced from the display panel, comprising an array of color filter portions 72R, 72G and 72B. The color filter 72 has portions of the same set of colors as the display panel 70. As shown, the red color filter portion 72R is aligned with the red output portion of the display panel, and the other colors are also aligned. By aligned is meant that the colors are aligned in the normal direction to the display panel.

The display panel 70 can be operated in a privacy mode. For example, the blue output portion 70B of the display panel produces blue light which can pass through the blue filter portion 72B in a normal direction. This provides a central viewing zone. In this way, the display panel produces output regions of different light output color, which regions are aligned with corresponding color portions of the color filter layer 72.

Light to the side of the viewing zone is blocked. For example the blue light angled just one color filter portion to the right or left is blocked by the red and green filter portions 72R, 72G. In this way, a double filtering takes place.

The filters only allow the selected color to pass, so that a double filtering with different color filters functions as a light blocking function.

In a public mode, the display panel produces light containing all of the output colors to all of the output regions. In this case, there is only one color filter layer. The display device then function as a conventional display, although with the color filters for the sub-pixels moved from the display panel to a position spaced from the display panel.

By providing a color filter layer spaced from the display panel, color filtering is used to control the range of angles over which an image is output.

The color filter layer 72 only blocks light when the filter colors are different. For the light 74 which passes through the next laterally positioned blue filter 72B, the light can escape.

This light should be blocked to provide a single private viewing zone. This can be achieved by limiting the angular output from the display panel 70, for example by controlling the angular width of the output light from a backlight.

The spacing between the color filter layer 72 and the display panel, as well as the width of the color filter portions determines the extent by which the light output is angularly limited. For example, the spacing between the color filter layer 72 and the upper surface of the display panel may be at least the width w of the color filter portions.

Preferably, the spacing is at least 1.5 times the width and more preferably at least 2 times the width. The larger the spacing, the smaller the cone width of the central view (so the output is more private) but the greater the need to block lateral views such as 74 as they will be present at less steep angles.

As mentioned above, the invention may be applied to autostereoscopic displays. FIG. 7 shows a lens array 76 for this purpose. As shown, each color filter portion is associated with one lens. The lenses are lenticular stripes, and the color portions of the color filter layer are also stripes. Stripes in the vertical direction (or indeed slightly offset from the vertical direction) provide control of the extent to which images are visible from the sides, which is of most interest for privacy displays.

There are different ways to implement the display panel.

In a first set of examples, the display panel is controllable in the privacy mode to provide the output regions of different light output color as stripes of different color at the same time, and in the public mode to provide a white output.

Figure 8:
FIG. 8 shows a first example of display panel.

FIG. 8 shows one implementation. The display panel 70 comprises a pixelated emissive display panel. It has an array of sub-pixels 80 which can be controlled to vary the output color of each pixel, wherein a pixel has the size of a single output region, such as 70R.

In this design, the resolution of the display panel is greater than the resolution of the color filter 72. The display can be driven to output stripes of color, with different intensity at different locations along the stripe to provide a string of single color pixels. When the striped color output is provided, there are essentially two color filtering operations; one implemented by the color generation process of the display panel and the other at the filter layer 72. This enables laterally directed light to be blocked, in that a light output is only allowed where the output color from the display panel matches the color filter portion in the color filter layer 72.

In the public mode, the display can emit white light, again with an intensity varied at the pixel level. In this mode, the display panel provides intensity control at the pixel level, and it combines with the color filter layer 72 to form the overall color display.

In a second set of examples, the display panel comprises a backlight and a sub-pixel array. The backlight is controllable to provide different color outputs in sequence.

In the privacy mode, the array of sub-pixels provides stripes of output sub-pixels in synchronism with the backlight sequence, with the other sub-pixels set to a non-output state, thereby providing the output regions of different light output color in sequence.

Figure 9:
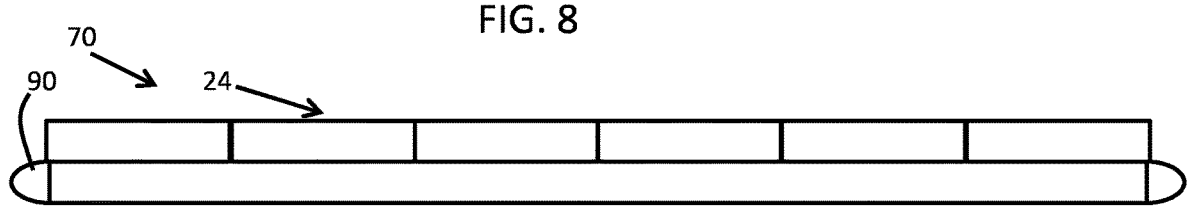
FIG. 9 shows a second example of display panel.

FIG. 9 shows an example of the display panel 70. It has a backlight 90 and a pixel array 24. The backlight can generate different colors. It may for example comprise an edge-lit waveguide, in which different color light can be coupled in to the waveguide (from LEDs for example) to generate a desired output color or white.

This version provides a time sequential operation. For each backlight color, only a sub-set of sub-pixels are used, and the others are switched to black. Thus, in the private mode each sub-pixel is set to black in two of the three sub-frames.

This means a striped display panel output is provided in a sequence of different colors, with the different color stripes at different physical positions. This approach does not need a segmented backlight, in that the full backlight output is always the same color. The public mode has an effective viewing cone that is three times as wide as the primary cone. Having such a large viewing cone has a large benefit because it allows the viewer much more space to move in front of the display. Furthermore it has the effect of opening up the viewing zone towards larger viewing distances.

Note that in these designs, by moving the color filters away from the sub-pixels, for example to the lenticular lens array when one is used, light absorption has moved but is not increased, so the light efficiency is similar.

The backlight may have an angularly limited light output such that the light from the light output regions of the display panel do not reach the next laterally offset corresponding color portions of the color filter array. In this way, the beams 74 shown in FIG. 7 can be prevented from propagating. The color filtering is used to block light immediately laterally to the sides of the normal direction (which is the direction in which the color filters align) and the backlight design is used to prevent light reaching further laterally offset viewing angles.

When a color filter with three colors is used, only secondary and tertiary cones are blocked by the color filters. Larger angles are easy to block by suitable design of the backlight, for example by integrating microstructures such as louvres or honeycomb structures in the backlight.

In an example using three filter colors, the result is a private mode with a viewing angle of 1 cone and a public mode with a viewing angle of 5 cones. The invention is particularly suitable for a typical close viewing distance where the cone angle is larger, e.g. 20°, such that the public mode covers a wide viewing angle, e.g. 100°.

When lenses are used to create an autostereoscopic display, the width of a 3D pixel in the output image is three lenses, rather than having multiple pixels beneath each lens. If the intent is to have square pixels, and the display is to generate N views, then the display sub-pixels should have a 1:3N aspect ratio.

For this reason, the invention is of primary interest for autostereoscopic displays with a small number of views, e.g. 2, 3 or 4 or a fractional number in the same range of 2 to 4.

Instead of (or as well as) blocking large angles of light output, the display device may comprise a second color filter layer between the display panel and the lens array.

Figure 10:
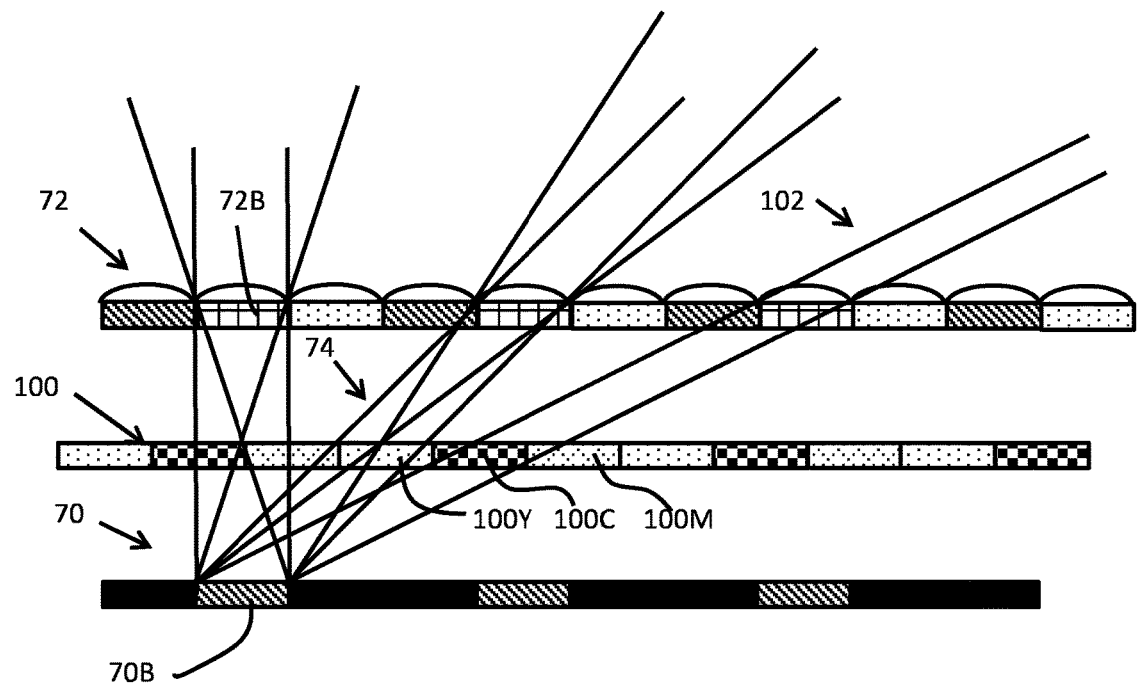
FIG. 10 shows a second example of display device of the invention in a first mode.

FIG. 10 shows an example, in which a second color filter has color subtractive filter elements 100C (cyan) 100M (magenta) and 100Y (yellow). The blue light output region 70B send light through the magenta and cyan subtractive filters, which allow blue light to pass to the blue filter portion 72B of the main filter layer 72.

The lateral light 74 that was directed toward the first laterally offset blue filter portion is blocked by the yellow color subtractive filter. The yellow filter blocks the third cone to the left and right. This avoids the need to block large angles in the backlight. In a similar way, the cyan filter blocks red light and the magenta filter blocks green light.

The 6th cone to the left and right will in principle be transmitted (as indicated by the region 102), but it can be rejected by total internal reflection at the boundary towards air. In this way only the primary cone is emitted by the display.

Figure 11:
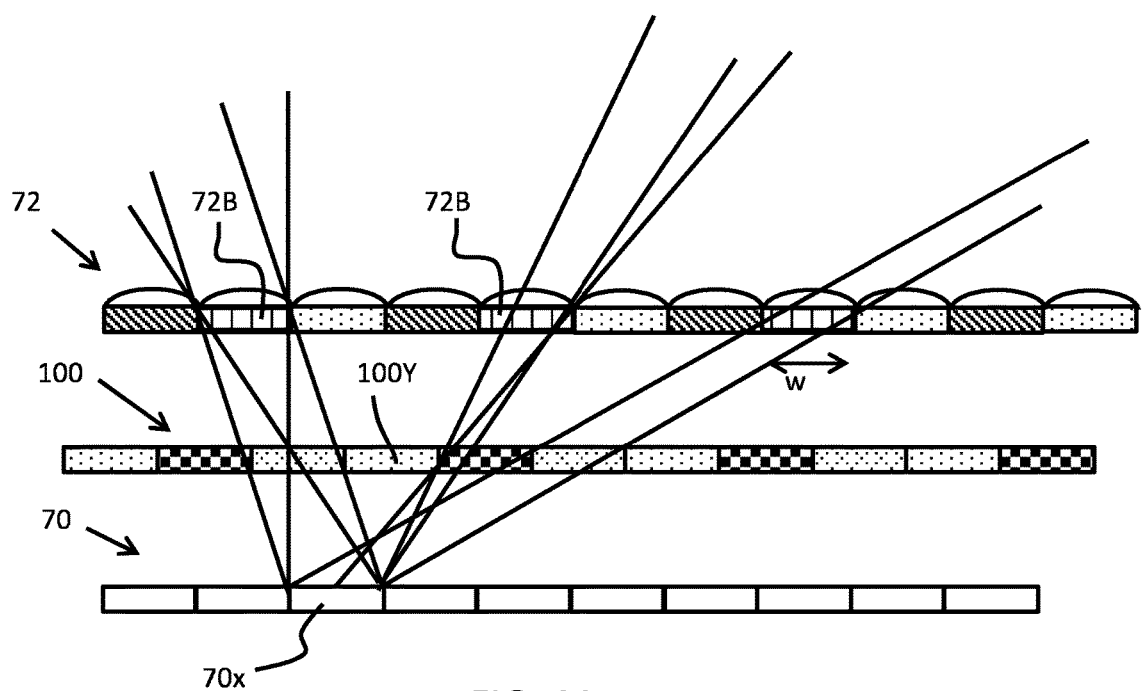
FIG. 11 shows the example of display device of the invention in a second mode.

FIG. 10 shows the private mode. FIG. 11 shows the public mode when no sub-pixels are turned off. It shows the direction of the blue output from the display for a pixel not beneath the blue filter portion. As shown, one pixel area 70x contributes to two light output directions (one cone to the left and two cones to the right). For the example of blue, light output is created wherever there is a path through a blue filter portion in the filter layer 72 which does not also pass through a yellow filter portion of the second filter layer 100. The steep angle light is again prevented by total internal reflection.

As shown, the second color filter layer 100 is preferably offset from the first color filter layer 72 by half the pitch w of the portions of the color filter layer. The filter portions of the two layers have the same pitch as each other.

As explained above, one example of backlight makes use of LEDs. This give good energy efficiency and they can be turned on and off quickly and thereby allow frame-based local dimming in order to improve the black level and power efficiency. Another step is to use RGB LEDs instead of white LEDs with the benefit that the color gamut can be increased. The LEDs can be placed behind the display panel or on the sides of a patterned waveguide to produce a side-lit display.

However, a cold cathode fluorescent lamp ("CCFL") backlight may instead by used, which typically comprises a row of CCFL lamps placed in a cavity lined with a white and diffuse (Lambertian) back. The light from the CCFL lamps either directly or via the back lining passes through a diffuser to hide the lamps and ensure sufficiently uniform screen intensity.

Organic light emitting diodes (OLED), organic light emitting transistors (OLET) and quantum dot LEDs (QLED) may also be used to create backlights as the techniques allow to create a uniformly emitting surface. This removes the need for diffusers and waveguides and thus can reduce the number of components and make the display even thinner. However, to use the full potential of these techniques, the pixels themselves could be emitters to improve the efficiency as explained above with reference to FIG. 8.

A backlight can then be dispensed with for the generation of the image to be displayed if a direct emitting display technology is used.

The invention can be applied to all of these types of display.

The examples above show non-switchable autostereoscopic displays.

By making the lens of a multi-view display switchable, it becomes possible to have a high 2D resolution mode in combination with a 3D mode. Other uses of switchable lenses are to increase the number of views time-sequentially (WO 2007/072330) and to allow multiple 3D modes (WO 2007/072289). Known methods to produce a 2D/3D switchable display replace the lenticular lens by:

(i) A lens shaped cavity filled with liquid crystal material of which the lens function is turned on/off by electrodes that control the orientation of LC molecules or is turned on/off by changing the polarization of the light (through a switchable retarder).

(ii) A box shaped cavity filled with liquid crystal where electrodes control the orientation of LC molecules to create a gradient-index lens (see for instance WO 2007/072330).

(iii) An electro wetting lens of droplets of which the shape is controlled by an electric field.

(iv) A lens-shaped cavity filled with transparent electrophoretic particles in a fluid of different refractive index (WO 2008/032248).

This invention can be applied to switchable autostereoscopic displays, for example of the types outlined above.

The examples above show the use of the invention in an autostereoscopic display. The invention may however be used for a 2D display, to provide private and public viewing modes.

The lens designs shown in the examples above all face away from the display panel (i.e. they are convex when viewed from the display panel, and concave when viewed from the display output). The lenses may curve in the opposite direction with a solid-solid refractive index interface instead of the solid-air interface as shown above.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A display device comprising:
   a display panel; and
   a first color filter layer, the first color filter comprising an array of first color filter portions, wherein the first color portions comprise at least three colors,
   wherein the first color filter layer is spaced from the display panel,
   wherein the first color filter layer is arranged to receive light from the display panel,
   wherein the display panel is configurable in a privacy mode, the privacy mode providing only a central viewing zone in which the display panel produces output regions of different light output color,
   wherein the output regions are aligned with corresponding first color portions of the first color filter layer in the privacy mode,
   wherein the display panel is configurable in a public mode, the public mode providing a central and lateral viewing zones,
   wherein the display panel produces light containing all of the output colors in each of the output regions in the public mode,
   wherein the display panel is arranged to provide the output regions of different light output color as stripes of different color at the same time in the privacy mode,
   wherein the display panel is arranged to provide a white output in the public mode.

2. The device as claimed in claim 1, wherein each portion of the first color filter layer transmits a specific color.

3. The device as claimed in claim 1, wherein the first color portions of the first color filter layer are stripes.

4. The device as claimed in claim 1, wherein the display panel comprises a backlight and an array of light modulating sub-pixels.

5. The device as claimed in claim 4,
   wherein the backlight is arranged to provide different color outputs in sequence, wherein the array of sub-pixels is arranged to provide stripes of output sub-pixels in synchronism with the backlight sequence in the privacy mode.

6. The device as claimed in claim 4,
wherein the backlight is arranged to provide different color outputs in sequence,
wherein the array of sub-pixels comprises a first set and a second set,
wherein the array of sub-pixels is arranged to provide stripes using the first set in synchronism with the backlight sequence in the privacy mode,
wherein the second set sub-pixels set to a non-output state in the privacy mode.

7. The device as claimed in claim 4,
wherein the backlight is arranged to provide different color outputs in sequence,
wherein the array of sub-pixels comprises a first set of sub-pixels and a second set of sub-pixels,
wherein the first set of sub-pixels is arranged to provide stripes in synchronism with the backlight sequence in the privacy mode,
wherein the second set of sub-pixels is arranged to provide the output regions of different light output color in sequence.

8. The device as claimed in claim 1, wherein the display panel has an angularly limited light output such that the light from the light output regions of the display panel do not reach the next, laterally offset, corresponding color portions of the first color filter array.

9. The device as claimed in claim 1, comprising a second color filter layer between the display panel and the first color filter layer.

10. The device as claimed in claim 9, wherein the second color filter layer comprises a color subtractive filter layer, wherein the second color filter layer is arranged such that the light output from the light output regions of the display panel are filtered out before reaching the next, laterally offset, corresponding color portions of the first color filter layer.

11. The device as claimed in claim 10,
wherein the first color portions have a first pitch,
wherein the second color filter layer is offset from the first color filter layer by half the first pitch.

12. The device as claimed in claim 1, further comprising a lens array spaced from the display panel, wherein each lens of the lens array is associated with one portion of the first color filter layer.

13. A method of controlling a display device to provide a privacy mode and a public mode, wherein the display device comprises a display panel and a first color filter layer spaced from the display panel, the first color layer comprising an array of first color filter portions, wherein the first color portions comprise at least three colors the method comprising:
controlling the display panel to produce output regions of different light output colors, wherein the output regions are aligned with corresponding first color portions of the first color filter layer in a privacy mode; and
controlling the display panel to produce light containing all of the output colors to all of the output regions,
controlling a backlight to provide the output regions of different light output color as stripes of different color at the same time in the privacy mode; and
controlling the backlight to provide a white output in the public mode.

14. The method as claimed in claim 13 further comprising:
controlling a backlight to provide different color outputs in sequence; and
controlling the array of sub-pixels to provide stripes of output sub-pixels in synchronism with the backlight sequence in the privacy mode.

15. The method as claimed in claim 13, comprising using a second, color subtractive, color filter layer to filter out light from the light output regions of the display panel before reaching a next laterally offset corresponding color portions of the first color filter layer.

16. The method as claimed in claim 13, wherein the array of sub-pixels comprises a first set of sub-pixels and a second set of sub-pixels, the method further comprising:
controlling a backlight to provide different color outputs in sequence; and
controlling the array of sub-pixels to provide stripes using the first set of sub-pixels in synchronism with the backlight sequence in the privacy mode
wherein the second set of sub-pixels is set to a non-output state in the privacy mode.

17. The method as claimed in claim 13, wherein the array of sub-pixels comprises a first set of sub-pixels and a second set of sub-pixels, the method further comprising:
controlling a backlight to provide different color outputs in sequence
wherein the first set of sub-pixels is arranged to provide stripes in synchronism with the backlight sequence in the privacy mode,
wherein the second set of sub-pixels is arranged to provide the output regions of different light output color in sequence.

18. A display device comprising:
a display panel; and
a first color filter layer, the first color filter comprising an array of first color filter portions, wherein the first color portions comprise at least three colors,
wherein the first color filter layer is spaced from the display panel,
wherein the first color filter layer is arranged to receive light from the display panel,
wherein the display panel is configurable in a privacy mode, the privacy mode providing only a central viewing zone in which the display panel produces output regions of different light output color,
wherein the output regions are aligned with corresponding first color portions of the first color filter layer in the privacy mode,
wherein the display panel is configurable in a public mode, the public mode providing a central and lateral viewing zones,
wherein the display panel produces light containing all of the output colors in each of the output regions in the public mode,
wherein the first color portions of the first color filter layer are stripes.

* * * * *